United States Patent Office 3,790,591
Patented Feb. 5, 1974

3,790,591
INTERMEDIATE 4-METHOXY ISOXAZOLES
Harry Allen Albrecht, Towaco, and John Thomas Plati, Rutherford, N.J., assignors to Hoffmann-La Roche Inc., Nutley, N.J.
No Drawing. Original application Aug. 6, 1970, Ser. No. 61,785, now Patent No. 3,706,761, which is a division of application Ser. No. 682,551, Nov. 13, 1967, now Patent No. 3,547,973, which in turn is a division of application Ser. No. 446,068, Apr. 6, 1965, now Patent No. 3,400,122. Divided and this application Aug. 11, 1972, Ser. No. 279,917
Int. Cl. C07d 85/44
U.S. Cl. 260—307 H
2 Claims

ABSTRACT OF THE DISCLOSURE

Antibacterial $N^1$-(4-methoxy-3-alkyl-5-isoxazolyl)-sulfanilamides, $N^1$-(4-methoxy-5-alkyl-3-isoxazolyl)sulfanilamides and their base addition salts with pharmaceutically acceptable bases are described. The $N^1$(4-methoxy-3-alkyl-5-isoxazolyl)sulfanilamides are prepared from the sequential intermediates 4-methoxy-5-alkylisoxazole, $$R-\overset{O}{\overset{\|}{C}}CHC\equiv N$$
$$\overset{|}{O}CH_3$$

wherein R is hydrogen or lower alkyl, and 5-amino-4-methoxy-3-alkylisoxazole. The $N^1$-(4-methoxy-5-alkyl-3-isoxazolyl)sulfanilamides are prepared from the sequential intermediates $$RCCl=C\overset{CN}{\underset{OCH_3}{\diagdown}}$$

wherein R is hydrogen or lower alkyl, and 3-amino-4-methoxy-5-alkylisoxazole.

CROSS-REFERENCE TO RELATED APPLICATIONS

This application is a division of U.S. patent application Ser. No. 61,785, filed Aug. 6, 1970, which in turn is a division of U.S. patent application Ser. No. 682,551, filed Nov. 13, 1967, which in turn is a division of U.S. patent application Ser. No. 446,068, filed Apr. 6, 1965, now U.S. Pat. Nos. 3,706,761, 3,547,973 and 3,400,122, respectively.

BRIEF SUMMARY OF THE INVENTION

The invention relates to 4-methoxy-5-alkylisoxazoles, 5 - amino - 4 - methoxy-3-alkylisoxazoles, and 3-amino-4-methoxy-5-alkylisoxazoles which are useful intermediates for the corresponding antibacterial $N^1$-(4-methoxy-3-alkyl-5-isoxazolyl)sulfanilamides and $N^1$-(4-methoxy-5-alkyl-3-isoxazolyl)sulfanilamides.

In another aspect, the invention relates to intermediates of the formulas $$R-\overset{O}{\overset{\|}{C}}CHC\equiv N$$
$$\overset{|}{O}CH_3$$

and $$RCCl=C\overset{CN}{\underset{OCH_3}{\diagdown}}$$

wherein R is hydrogen or lower alkyl.

DETAILED DESCRIPTION

This invention relates to sulfonamides and more particularly relates to sulfonamides of the formulas $$CH_3O-C=\!\!=\!\!C-NHSO_2-\!\!\!\!\diagup\!\!\!\!\!\diagdown\!\!\!\!-NH_2$$
$$R-C\diagdown_N\diagup O$$
(I)

and $$CH_3O-C=\!\!=\!\!C-NHSO_2-\!\!\!\!\diagup\!\!\!\!\!\diagdown\!\!\!\!-NH_2$$
$$R-C\diagdown_O\diagup N$$
(II)

and to methods for their preparation. In the above formulas, R is hydrogen or lower alkyl.

Compounds of Formulas I and II are prepared according to the following reaction schemes:

Reaction Scheme I $$R-\overset{O}{\overset{\|}{C}}CH_2OCH_3 + O=CH-N(CH_3)_2 \longrightarrow$$
(III)  (IV)

$$\underset{Cl}{R}\diagdown C=C\diagup^{OCH_3}_{CHO} + \underset{Cl}{R}\diagdown C=C\diagup^{CHO}_{OCH_3}$$
(Va)  (Vb)

$$\downarrow NH_2OH\cdot H^\oplus$$

$$R-\overset{O}{\overset{\|}{C}}CHC\equiv N \xleftarrow[\text{alkali metal lower alkoxide or hydroxide}]{} R-C=\!\!=\!\!C-OCH_3$$
$$\overset{|}{O}CH_3 \qquad\qquad\qquad O\diagdown_N\diagup CH$$
(VII)  (VI)

$$\downarrow NH_2OH$$

$$CH_3O-C=\!\!=\!\!C-NH_2 \quad 1.\ Y-\!\!\!\!\diagup\!\!\!\!\!\diagdown\!\!\!\!-SO_2X \quad (IX)$$
$$R-C\diagdown_N\diagup O$$
(VIII)

2. alkali metal hydroxide
$\longrightarrow$ $$CH_3O-C=\!\!=\!\!C-NHSO_2-\!\!\!\!\diagup\!\!\!\!\!\diagdown\!\!\!\!-NH_2$$
$$R-C\diagdown_N\diagup O$$
(I)

3. conversion of Y to —$NH_2$, if necessary

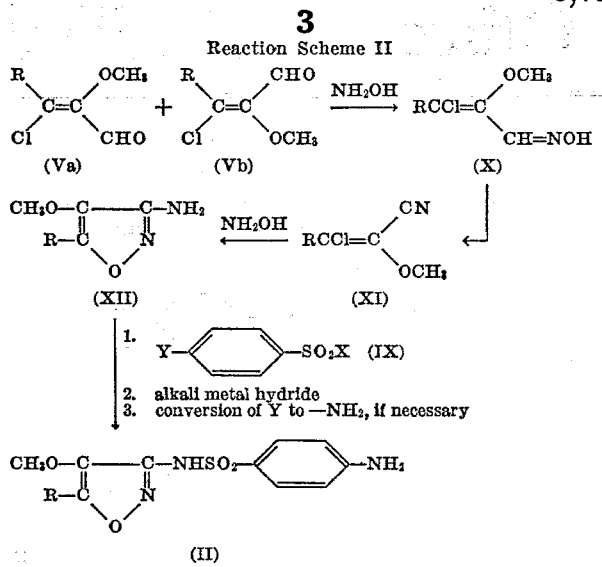

Reaction Scheme II

In the above Reaction Schemes I and II, R is hydrogen or lower alkyl, X is chlorine or bromine, preferably chlorine, and Y is a protected amino group or an amino group precursor, i.e., a group which can be converted to an amino group through reduction or hydrolysis, for example, nitro, nitroso, azo, hydrazo, hydrazido, carbalkoxyamino, carbobenzyloxyamino, etc., or preferably an acylamido group, for example, an alkanoylamido group, preferably a lower alkanoylamido group, e.g., acetamido, propionylamido, etc., or a benzamido or substituted benzamido group, e.g., alkyl- or halo-substituted benzamido.

In Reaction Scheme I a methoxy methyl ketone of Formula III is reacted with dimethyl formamide (IV) in the presence of phosphorus oxychloride or phosgene, preferably at a temperature in the range of from about 0° to about 100° C. to form a mixture of aldehydes of Formulae Va and Vb. This mixture of aldehydes is then reacted with a mineral acid addition salt of hydroxylamine, e.g., hydroxylamine hydrochloride, hydroxylamine sulfate, etc., preferably at a temperature in the range of from about 35° to about 85° C., and preferably in an inert solvent, e.g., a lower alkanol solvent such as methanol, ethanol, etc., to form a 4-methoxy-5-lower alkyl isoxazole of Formula VI. Compound VI is reacted with an alkali metal lower alkoxide, e.g., sodium methoxide, sodium ethoxide, etc., or an alkali metal hydroxide, e.g., sodium hydroxide, potassium hydroxide, etc., preferably at a temperature in the range of about 20° to about 65° C. to form a ketonitrile of Formula VII. The ketonitrile of Formula VII is reacted with a mineral acid addition salt of hydroxylamine, e.g., hydroxylamine hydrochloride, etc., preferably in the presence of water, to form an aminoisoxazole of Formula VIII. This aminoisoxazole is then treated with a sulfonyl halide of Formula IX in the presence of an acid binding agent such as an amine, e.g., pyridine, trimethylamine, etc., to form a sulfanilyl compound. The latter is treated with an aqueous alkali metal hydroxide, e.g., sodium hydroxide, potassium hydroxide, etc.; and finally the Y group is converted to amino, if necessary, by a known procedure in the sulfonamide art. Where Y is a group hydrolyzable to amino such as acetamido, hydrolysis of the hydrolyzable group takes place upon treatment with the alkali metal hydroxide to yield a compound of Formula I directly. However, where Y is an amino group precursor which is reducible to an amino group, then a standard reduction reaction such as hydrogenation with a palladium catalyst, is carried out to give a compound of Formula I.

Compounds of Formula II are prepared according to Reaction Scheme II by treating a mixture of aldehydes of Formulae Va and Vb with hydroxylamine under alkaline conditions, i.e., in the presence of a base, e.g., an alkali metal carbonate such as sodium carbonate, an alkali metal hydroxide such as sodium hydroxide, potassium hydroxide, etc., an alkali metal lower alkoxide such as sodium methoxide, sodium ethoxide, etc., to form an oxime of Formula X (which is probably a mixture of cis-trans isomers). The oxime of Formula X is dehydrated by the use of phenyl isocyanate, preferably in the presence of an inert hydrocarbon solvent, e.g., benzene, toluene, hexane, etc., at a temperature in the range of about 20° to about 85°, to form a nitrile of Formula XI. The nitrile of Formula XI is then reacted with hydroxylamine under alkaline conditions, e.g., in the presence of an alkali metal hydroxide such as sodium hydroxide, potassium hydroxide, etc., an alkali metal lower alkoxide such as sodium methoxide, sodium ethoxide, etc., to form an aminoisoxazole of Formula XII. The aminoisoxazole of Formula XII is then reacted with a sulfonyl halide of Formula IX in the presence of an acid binding agent such as an amine, e.g., pyridine, trimethylamine, etc., to form a sulfanilyl derivative which is treated with an alkali metal hydroxide as above, and the Y group converted to —NH₂ if necessary (as described above for Reaction Scheme I) to form a compound of Formula II.

Preferred compounds of Formulae I and II are those wherein R is methyl.

The term "lower alkyl" used herein is to be understood to refer to an alkyl group having from 1 to 7 carbon atoms, which can be either straight or branched chain, e.g., methyl, ethyl, propyl, isopropyl, butyl, heptyl, hexyl, etc.

Compounds of Formulae I and II and their base addition salts with pharmaceutically acceptable bases, such as sodium hydroxide, diethanolamine, etc., are antibacterial agents useful in the same manner as known sulfonamides, e.g., sulfadimethoxine. They are characterized by a wide spectrum of antibacterial activity. They can be employed in oral or parenteral dosage forms or for topical application such as in salves, otic formulations, etc. in combination with common pharmaceutical adjuvants. Typical dosage forms are given below:

TABLET FORMULATION

|  | Per tablet, mg. |
|---|---|
| $N^1$-(4-methoxy-3-methyl-5-isoxazolyl) sulfanilamide | 505 |
| Corn starch | 29 |
| Lactose | 84 |
| Gelatin | 12 |
| Talcum | 15 |
| Magnesium stearate | 5 |

Procedure (1) $N^1$-(4-methoxy-3-methyl-5-isoxazoylyl)sulfanilamide, corn starch, and lactose were thoroughly mixed in suitable blending equipment and granulated with a 10 percent gelatin solution.

(2) The moist mass was passed through a No. 12 screen, and the granules were dried on paper lined trays overnight.

(3) The dried granules were passed through a No. 14 screen and placed in a suitable mixer. The talcum and magnesium stearate were added and blended.

(4) The granulation was compressed into tablets weighing approximately 650 mg. each, using punches having an approximate diameter of 12.7 mm. (½"). The final tablet thickness was about 5.35 mm.

PARENTERAL FORMULATION

|  | Mg./cc. |
|---|---|
| $N^1$-(4-methoxy-3-methyl-5-isoxazolyl)sulfanilamide | 412.0 |
| Diethanolamine | 159.0 |
| Sodium metabisulfite | 2.0 |
| Water for injection USP q.s. ad 1.0 cc. | |

Procedure (1) The sodium metabisulfite was dissolved in the water for injection in a suitable size glass container (glass-lined container may also be used).

(2) Successive portions of the $N^1$-(4-methoxy-3-methly-5-isoxazolyl)sulfanilamide were suspended in the solution and dissolved by the addition of somewhat less than the equivalent quantity of diethanolamine until the required concentration solution was reached.

(3) The solution was filtered through a filter press to remove the gross particles, and then through a No. 015 candle to achieve final clarity and sterility.

(4) The solution was filled under aseptic conditions into 5 cc. amber vials, sealed, and sterilized for 20 minutes at 250° F.

(5) The ampuls were inspected, and any ampuls showing insoluble material were rejected.

TABLET FORMULATION

| | Per tablet, mg. |
|---|---|
| $N^1$-(4-methoxy-5-methyl-3-isoxazolyl)sulfanilamide | 505 |
| Corn starch | 29 |
| Lactose | 84 |
| Gelatin | 12 |
| Talcum | 15 |
| Magnesium stearate | 5 |

Procedure (1) $N^1$-(4-methoxy - 5 - methyl-3-isoxazolyl)sulfanilamide, corn starch, and lactose were thoroughly mixed in suitable blending equipment and granulated with a 10 percent gelatin solution.

(2) The moist mass was passed through a No. 12 screen, and the granules were dried on paper lined trays overnight.

(3) The dried granules were passed through a No. 14 screen and placed in a suitable mixer. The talcum and magnesium stearate were added and blended.

(4) The granulation was compressed into tablets weighing approximately 650 mg. each, using punches having an approximate diameter of 12.7 mm. (½″). The final tablet thickness was about 5.35 mm.

PARENTERAL FORMULATION

| | Mg./cc. |
|---|---|
| $N^1$-(4-methoxy-5-methyl-3-isoxazolyl)sulfanilamide (claim 400 mg.) | 412.0 |
| Diethanolamine | 159.0 |
| Sodium metabisulfite | 2.0 |
| Water for injection USP q.s. ad 1.0 cc. | |

Procedure (1) The sodium metabisulfite was dissolved in the water for injection in a suitable size glass container (glass-lined container may also be used).

(2) Successive portions of the $N^1$-(4-methoxy-5-methyl-3-isoxazolyl)sulfanilamide were suspended in the solution and dissolved by the addition of somewhat less than the equivalent quantity of diethanolamine until the required concentration solution was reached.

(3) The solution was filtered through a filter press to remove the gross particles, and then through a No. 015 candle to achieve final clarity and sterility.

(4) The solution was filled under aseptic conditions into 5 cc. amber vials, sealed, and sterilized for 20 minutes at 250° F.

(5) The ampuls were inspected, and any ampuls showing insoluble material were rejected.

The following examples are given for illustration purposes only and are not meant to limit the invention.

EXAMPLE 1

Preparation of $N^1$-(4-methoxy-5-isoxazolyl)sulfanilamide

N,N-dimethylformamide (438 g.) was cooled in an ice-salt bath while phosphorus oxychloride (452 ml.) was added at 2–5° with vigorous stirring over a period of two hours. The cold bath was removed and the reaction stirred for 30 minutes, during which time the temperature rose to 15°. The mixture was then warmed momentarily on a water bath and the temperature maintained at 20–24° for 30 minutes.

With cooling below 10° methoxyacetone (176 g.) was added over a period of 25 minutes and the bath was removed to permit a spontaneous heat generation. Within 15 minutes the temperature reached 35° and was controlled at 35–40° for 35 minutes by intermittent cooling. The mixture was poured into 2 kg. of cracked ice. Sodium chloride (400 g.) was added and the mixture allowed to warm to 15°. While maintaining the temperature between 15 and 22° by intermittent cooling with an ice bath, the mixture was extracted with three 1200 ml. portions of ether. The ether extracts were combined and washed successively with saturated sodium chloride (400 ml.), saturated sodium bicarbonate solution (400 ml.), and finally with saturated sodium chloride solution (250 ml.). After drying with sodium sulfate, the ether solution was concentrated on the steam bath and the residue distilled; yield of a cis-trans mixture of 3-chloro-2-methoxy-2-butenal, 142 g.; boiling point 70–80°/20 mm.

3-chloro-2-methoxy-2-butenal (cis-trans mixture) (100 g.), hydroxylamine hydrochloride (77.5 g.), and methanol (750 ml.) were refluxed for two hours. When the mixture had cooled to 40° a solution of cadmium chloride (450 g. of $CdCl_2.2½H_2O$) in water (400 ml.) was added. The cadmium chloride complex was allowed to crystallize overnight before filtering and washing with methanol and ether.

The complex (21.8 g.) was mixed with 100 ml. of water and distilled, collecting about 50 ml. of distillate consisting of two phases. The distillate was saturated with sodium chloride and extracted with five 10 ml. portions of ether. The ether was dried with sodium sulfate and distilled on the steam bath. The residue, 4-methoxy-5-methylisoxazole (6.1 g.), was distilled under reduced pressure; yield 4.81 g.; boiling point 108°/100 mm.

4-methoxy-5-methylisoxazole (4.81 g.) was added to a solution of sodium methoxide (4.60 g.) in methanol (50 ml.) with momentary cooling to keep the reaction temperature below 40°. At this point the sodium salt of the ketonitrile partially precipitated, but was allowed to remain in the mixture. After standing for one hour, the methanol was evaporated in vacuo. Water (10 ml.) and hydroxylamine hydrochloride (2.98 g.) were added, and the mixture was warmed to 60° for 30 minutes. After standing for about 16 hours at room temperature, the mixture was extracted with five 10 ml. portions of ether. The ether extracts were dried with $NaSO_4$ and evaporated in vacuo to leave a 4.90 g. residue. Crystallization from ether (10 ml.) and petroleum ether (2 ml.) in an ice-salt bath gave the major portion of product, 5-amino-4-methoxy-3-methylisoxazole, 3.30 g., melting point 48–49°.

The filtrate was evaporated, and the residue crystallized from ether (2 ml.) and petroleum ether (1 ml.) to obtain a second crop: 0.95 g., melting point 48–49°. Total yield, 4.25 g.

5-amino-4-methoxy-3-methylisoxazole (3.75 g.) was dissolved in dry pyridine (38 ml.) and p-acetylaminobenzenesulfonyl chloride (15.1 g.) was added. On stirring into solution the reaction temperature rose to 40° where it was maintained by warming for 1½ hours.

The mixture was cooled to room temperature, and diluted with water (375 ml.). The oily precipitate was left standing overnight to solidify. The crude product, a bis(p-acetylaminobenzenesulfonyl) compound (14.35 g., darkens at 190°, melts 224–225°) was used directly.

A sample purified for analysis by crystallization from acetic acid melted at 233–234°.

The bis(p - acetylaminobenzenesulfonyl) compound (14.35 g.) and 144 ml. of 10 percent w./w. aqueous sodium hydroxide were stirred and heated on the steam bath for 40 minutes. Cooling and treatment with 25 percent aqueous acetic acid (110 ml.) precipitated the product (7.20 g., melting point 166–169°). Crystallization from methanol (50 ml.) and water (100 ml.) gave the pure product, $N^1$-(4-methoxy-3-methyl-5-isoxazolyl)sulfanilamide; yield 6.88 g.; melting point 168–170°.

EXAMPLE 2

Preparation of $N^1$-(4-methoxy-5-methyl-3-isoazolyl) sulfanilamide 3-chloro-2-methoxy-2-butenal (cis-trans mixture) 122.0 g.) was added with stirring to a solution of hydroxylamine hydrochloride (70 g.) and sodium hydroxide (40 g.) in 1 liter of water. The reaction was stirred two hours, and the crude product filtered (101.4 g., melting point 68–85°). This material consisted of a mixture of isomers of 3-chloro-2-methoxy-2-butenal oxime.

Crystallization from ether (100 ml.) and petroleum ether (400 ml.) yielded the isomer formed as the major product; yield 59.3 g.; melting point 91–94°.

Further recrystallization for analysis gave a melting point of 95–96°.

Evaporation of the filtrate and trituration of the residue wiht petroleum ether gave a mixture enriched in the second isomer (29.5 g., melting point 52–67°). Further crystallization of a similarly obtained material gave a product, which still contained approximately one-third of the higher melting isomer.

3-chloro-2-methoxy-2-butenal oxime (melting point 91–94°) (59.3 g.) was added to a solution of phenyl isocyanate (94.5 g.) and triethylamine (3.5 ml.) in benzene (600 ml.). After stirring for 15 minutes, the mixture was cautiously heated on the steam bath and refluxed 2½ hours.

The mixture was cooled, and the precipitate of sym.-diphenylurea was filtered. The benzene solution was concentrated on the steam bath, and the residue, 3-chloro-2-methoxy-2-butenenitrile, distilled in vacuo; yield 32.5 g.; boiling point 59–62°/20 mm.

A mixture fo 3-chloro-2-methoxy-2-butenenitrile (21.0 g.), hydroxylamine hydrochloride (16.8 g.), sodium methoxide (21.6 g.), and methanol (200 ml.) was stirred at 40° for 18 hours. The mixture was filtered and the filtrate evaporated to dryness in vacuo. The residue was extracted with warm ether (200 ml.). The ether solution was evaporated in vacuo and the residue, 3-amino-4-methoxy-5-methylisoxazole (15.6 g.) crystallized from ether (20 ml.) at −10° to give the major portion of the product (1.05 g., melting point 90–92°).

A further amount of aminoisoxazole was recovered from the filtrate. The residue after evaporation of the ether was vigorously shaken with water (140 ml.), centrifuged, and the aqueous solution decanted. Evaporation of the water left a residue (4 g.) which crystallized from ether (6 ml.) at −10° to give additional product (0.43 g., melting point 85–89°). Total yield, 1.48 g.

A sample purified by recrystallization from ether melted at 91–93°.

3-amino-4-methoxy-5-methylisoxazole (1.35 g.) was dissolved in dry pyridine (13.5 ml.), and p-acetylaminobenzenesulfonyl chloride (5.42 g.) was added. On stirring into solution, the temperature rose to 40°, where it was maintained by warming for 1½ hours. The mixture was cooled, and diluted with water (140 ml.). The precipitate, a bis(p-acetylaminobenzenesulfonyl) compound, solidified on standing overnight (4.82 g., melting point 230–235°). Recrystallization of a sample from acetic acid raised the melting point to 239–241°.

The bis product (4.82 g.) and 50 ml. of 10 percent w./w. aqueous sodium hydroxide were stirred on the steam bath for one hour. Cooling and treatment with 25 percent acetic acid (35 ml.) precipitated the product $N^1$-(4-methoxy-5-methyl-3-isoxazolyl)-sulfanilamide (2.00 g., melting point 189–191°), which was recrystallized from methanol (40 ml.) and water (120 ml.); yield 1.83 g.; melting point 197–199°.

We claim:
1. A compound of the formula

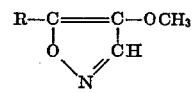

wherein R is selected from the group consisting of hydrogen and lower alkyl.

2. A compound according to claim 1, wherein R is methyl, i.e., 4-methoxy-5-methylisoxazole.

References Cited
UNITED STATES PATENTS
3,706,761    12/1972    Albrecht et al. _____ 260—307 H DONALD G. DAUS, Primary Examiner R. V. RUSH, Assistant Examiner